(12) United States Patent
Porter

(10) Patent No.: US 6,626,787 B2
(45) Date of Patent: Sep. 30, 2003

(54) ON-DEMAND ALL-WHEEL DRIVE SYSTEM

(75) Inventor: Fred C. Porter, Beverly Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 10/083,941

(22) Filed: Feb. 27, 2002

(65) Prior Publication Data

US 2002/0142879 A1 Oct. 3, 2002

Related U.S. Application Data

(60) Provisional application No. 60/280,797, filed on Apr. 2, 2001.

(51) Int. Cl.[7] ............................................. F16H 48/06
(52) U.S. Cl. ...................... 475/221; 475/116; 475/117; 475/99; 475/108; 180/247
(58) Field of Search ................. 475/221, 116, 475/117, 93, 99, 100, 101, 103, 108, 231, 238, 239; 180/247–250; 192/103 F, 35, 82 T

(56) References Cited

U.S. PATENT DOCUMENTS

| | | | |
|---|---|---|---|
| 4,031,780 A | | 6/1977 | Dolan et al. |
| 4,650,028 A | | 3/1987 | Eastman et al. |
| 4,840,247 A | | 6/1989 | Kashihara et al. ........... 180/249 |
| 4,866,624 A | | 9/1989 | Nishikawa et al. ........ 364/426.3 |
| 4,895,236 A | | 1/1990 | Sakakibara et al. ........ 192/84 R |
| 4,950,214 A | | 8/1990 | Botterill ....................... 475/231 |
| 5,083,635 A | * | 1/1992 | Tashiro ........................ 180/248 |
| 5,086,867 A | | 2/1992 | Hirota et al. ................ 180/248 |
| 5,135,071 A | * | 8/1992 | Shibahata et al. ........... 180/249 |
| 5,148,903 A | | 9/1992 | Kobayashi et al. ...... 192/85 AA |
| 5,310,388 A | * | 5/1994 | Okcuoglu et al. ............. 475/88 |
| 5,366,419 A | | 11/1994 | Oda ............................ 475/160 |
| 5,411,447 A | | 5/1995 | Frost ........................... 475/223 |
| 5,699,888 A | | 12/1997 | Showalter .................... 192/35 |
| 5,827,145 A | * | 10/1998 | Okcuoglu ..................... 475/88 |
| 5,904,632 A | | 5/1999 | Brown et al. ................ 475/206 |
| 5,910,064 A | | 6/1999 | Kuroki ........................ 475/199 |
| 5,964,126 A | | 10/1999 | Okcuoglu ..................... 74/650 |
| 5,967,285 A | | 10/1999 | Mohan et al. ........... 192/103 F |
| 6,041,903 A | | 3/2000 | Burns et al. ............ 192/85 AA |
| 6,076,646 A | | 6/2000 | Burns ..................... 192/85 AA |
| 6,095,939 A | | 8/2000 | Burns et al. .................. 475/88 |
| 6,112,874 A | | 9/2000 | Kopp et al. ............. 192/85 AA |
| 6,142,905 A | | 11/2000 | Brown et al. ................ 475/206 |
| 6,155,947 A | | 12/2000 | Lowell ......................... 475/88 |
| 6,158,303 A | | 12/2000 | Khiraishi et al. .......... 74/665 T |
| 6,186,258 B1 | | 2/2001 | Deutschel et al. ........... 180/197 |
| 6,296,590 B1 | | 10/2001 | Gassmann ................... 475/231 |
| 6,315,097 B1 | | 11/2001 | Burns ........................... 192/35 |
| 6,318,532 B1 | | 11/2001 | Gassmann .................... 192/35 |
| 6,378,677 B1 | | 4/2002 | Kuroda et al. ................ 192/35 |
| 6,398,686 B1 | | 6/2002 | Irwin ........................ 475/150 |
| 6,413,182 B1 | * | 7/2002 | Yates III et al. .............. 475/86 |

\* cited by examiner

*Primary Examiner*—Sherry Estremsky
*Assistant Examiner*—Tisha D. Lewis
(74) *Attorney, Agent, or Firm*—Harness, Dickey & Pierce P.L.C.

(57) ABSTRACT

A drive axle assembly for use in an all-wheel drive vehicle having a first hydraulic coupling operable to automatically transfer drive torque to a secondary driveline in response to slip of the primary driveline and a second hydraulic coupling operable to bias torque and limit slip between the wheels of the secondary driveline.

34 Claims, 11 Drawing Sheets

ON-DEMAND ALL-WHEEL DRIVE SYSTEM

CROSS-REFERENCE TO RELATED APPLICATIONS

This application claims the benefit of U.S. Provisional Application Ser. No. 60/280,797, filed Apr. 2, 2001.

FIELD OF THE INVENTION

The present invention relates generally to hydraulic couplings for use in motor vehicle driveline applications for limiting slip and transferring torque between rotary members. More specifically, a drive axle assembly for an all-wheel drive vehicle is disclosed having a pair of hydraulic couplings each having a fluid pump, a multi-plate clutch assembly, and a fluid distribution system operable to control actuation of the clutch assembly.

BACKGROUND OF THE INVENTION

In all-wheel drive vehicles, it is common to have a secondary drive axle that automatically receives drive torque from the drivetrain in response to lost traction at the primary drive axle. In such secondary drive axles, it is known to provide a pair of clutch assemblies connecting each axleshaft to a prop shaft that is driven by the drivetrain. For example, U.S. Pat. No. 4,650,028 discloses a secondary drive axle equipped with a pair of viscous couplings. In addition, U.S. Pat. Nos. 5,964,126, 6,095,939 and 6,155,947 each disclose secondary drive axles equipped with a pair of pump-actuated multi-plate clutch assemblies. In contrast to these passively-controlled secondary drive axles, U.S. Pat. No. 5,699,888 teaches of a secondary drive axle having a pair of multi-plate clutches that are actuated by electromagnetic actuators that are controlled by an electronic control system.

SUMMARY OF THE INVENTION

An object of the present invention is to provide a drive axle assembly equipped with a pair of hydraulic couplings which are operably arranged for coupling a vehicle drivetrain to a pair of axleshafts.

It is another object of the present invention to provide a drive axle assembly for use in an all-wheel drive vehicle having a first hydraulic coupling operable to automatically transfer drive torque to a secondary driveline in response to slip of the primary driveline and a second hydraulic coupling operable to bias torque and limit slip between the wheels of the secondary driveline.

In carrying out the above object, the drive axle assembly of the present invention includes a pinion shaft, a first hydraulic coupling operably disposed between a driven prop shaft and the pinion shaft, and a differential drive module. The differential drive module includes a drive case driven by the pinion shaft, a differential unit operably interconnecting the drive case to a pair of axleshafts, and a second hydraulic coupling operably disposed between the drive case and one of the axleshafts.

The first hydraulic coupling includes a multi-plate clutch assembly and a clutch actuator. The clutch actuator includes a fluid pump and a piston assembly. The fluid pump is operable for pumping fluid in response to a speed differential between the pinion shaft and the prop shaft. The piston assembly includes a piston retained for sliding movement in a piston chamber and a multi-function control valve. The pump supplies fluid to the piston chamber such that a clutch engagement force exerted by the piston on the multi-plate clutch assembly is proportional to the fluid pressure in the piston chamber. The control valve is mounted to the piston and provides a pressure relief function for setting a maximum fluid pressure within the piston chamber. The control valve also provides a thermal unload function for releasing the fluid pressure within the piston chamber when the fluid temperature exceeds a predetermined temperature value.

In accordance with an optional construction, the multi-function control valve of the present invention can also provide a flow control function for regulating the fluid pressure in the piston chamber. The flow control function can further include a thermal compensation feature for accommodating viscosity variations in the fluid.

BRIEF DESCRIPTION OF THE DRAWINGS

Further objects, features and advantages of the present invention will become readily apparent from the following detailed specification and the appended claims which, in conjunction with the drawings, set forth the best mode now contemplated for carrying out the invention. Referring to the drawings:

DETAILED DESCRIPTION OF THE PREFERRED EMBODIMENTS

In general, the present invention is directed to a hydro-mechanical limited slip and torque transfer device, hereinafter referred to as a drive axle assembly, for use in connecting the drivetrain to a pair of axleshafts associated with a secondary driveline of an all-wheel drive vehicle. However, the drive axle assembly can also find application in other driveline applications including, but not limited to, limited slip differentials of the type used in full-time transfer cases and front-wheel drive transaxles. Furthermore, this invention advances the technology in the field of hydraulically-actuated couplings of the type requiring pressure relief and thermal unloading to prevent damage to the driveline components.

Figure 1:
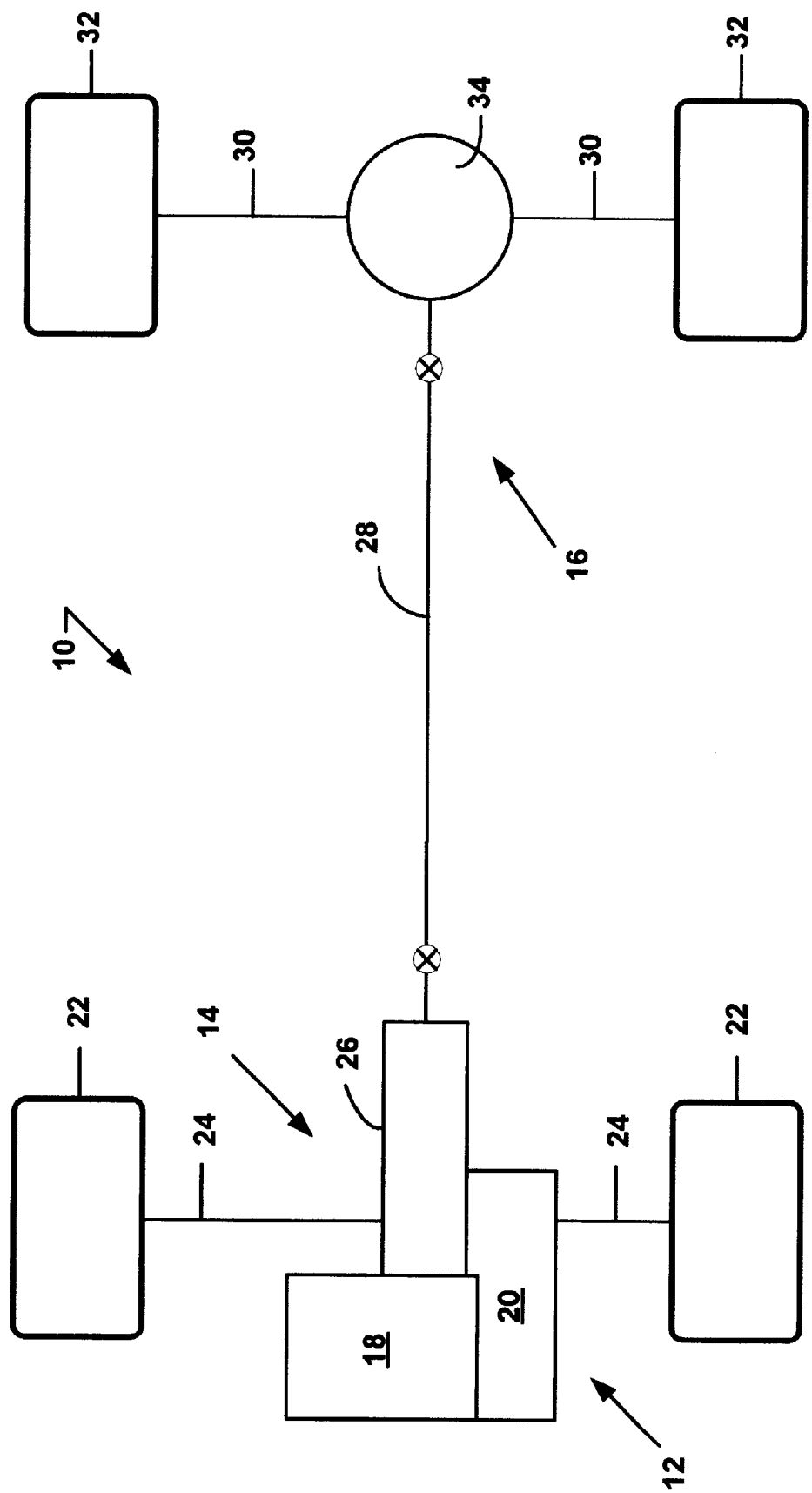
FIG. 1 is a schematic view of a motor vehicle drivetrain equipped with a secondary drive axle assembly constructed in accordance with the present invention.
Figure 2:
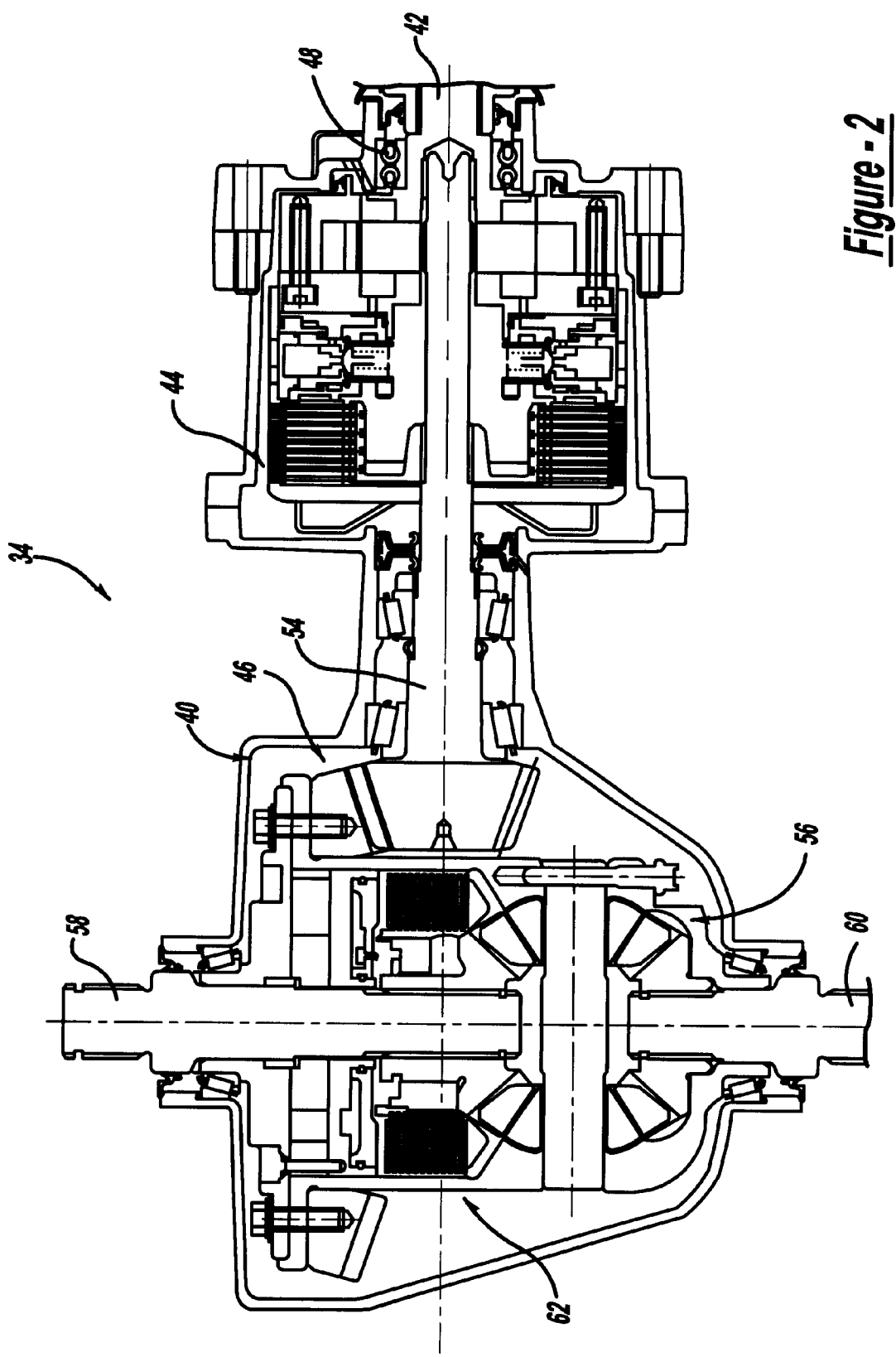
FIG. 2 is a sectional view of the secondary drive axle assembly of the present invention.
Figure 3:
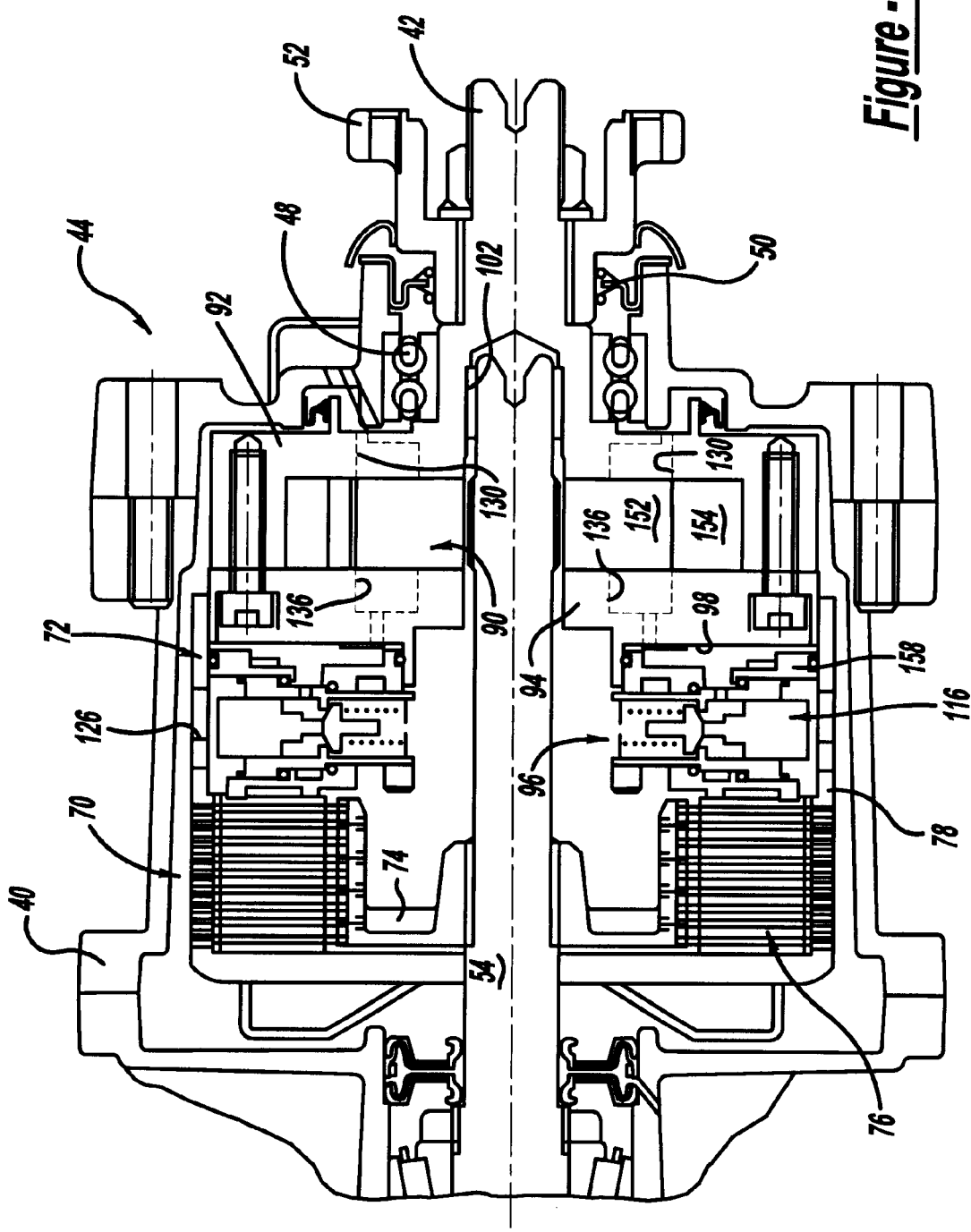
FIG. 3 is a sectional view of an on-demand hydraulic coupling associated with the secondary drive axle assembly.
Figure 4:
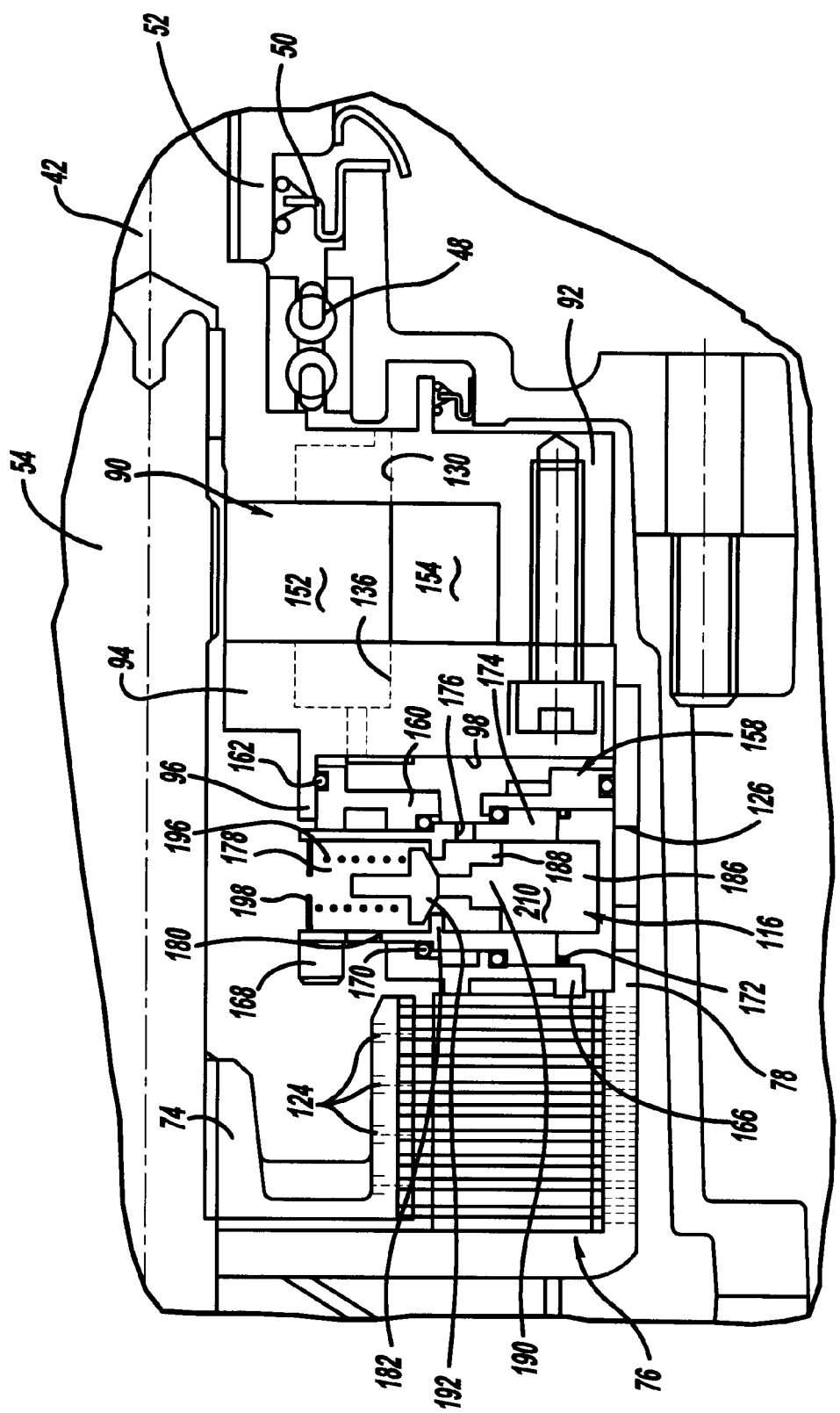
FIG. 4 is an enlarged partial view taken from FIG. 3 showing components of the hydraulic coupling in greater detail.

With reference to FIG. 1, a schematic layout for a vehicular drivetrain 10 is shown to include a powertrain 12 driving a first or primary driveline 14 and a second or secondary driveline 16. Powertrain 12 includes an engine 18 and a transaxle 20 arranged to provide motive power (i.e., drive torque) to a pair of wheels 22 associated with primary driveline 14. Primary driveline 14 further includes a pair of halfshafts 24 connecting wheels 22 to a differential assembly (not shown) associated with transaxle 20. Secondary driveline 16 includes a power take-off unit (PTU) 26 driven by transaxle 20, a prop shaft 28 driven by PTU 26, a pair of axleshafts 30 connected to a pair of wheels 32, and a drive axle assembly 34 operable to transfer drive torque from propshaft 28 to one or both axleshafts 30.

Referring to FIGS. 2 through 7, the components associated with drive axle assembly 34 will be now detailed. Drive axle assembly 34 includes a multi-piece housing 40, an input shaft 42, a first hydraulic coupling 44, and a rear differential module 46. Input shaft 42 is rotatably supported in housing 40 by a bearing assembly 48 and sealed relative thereto via a seal assembly 50. A yoke 52 is secured to input shaft 42 and is adapted for connection to propshaft 28. Drive module 46 includes a pinion shaft 54, a bevel-type differential gearset 56, a pair of output shafts 58 and 60 adapted for connection to axleshafts 30, and a second hydraulic coupling 62. In operation, first hydraulic coupling 44 is operable to transfer drive torque from input shaft 42 to pinion shaft 54 in response to excessive interaxle speed differentiation between propshaft 28 and differential gearset 56. Second hydraulic coupling 62 is operable to limit intraaxle slip in response to excessive speed differentiation between output shafts 58 and 60.

First hydraulic coupling 44 includes a transfer clutch 70 and a clutch actuator 72. Transfer clutch 70 is a multi-plate clutch assembly including a clutch hub 74 fixed (i.e., splined) to pinion shaft 54 and a clutch pack 76 of interleaved inner and outer clutch plates that are respectively splined to hub 74 and a clutch drum 78. Clutch actuator 72 includes a fluid pump 90 disposed in a pump chamber formed between and end plate 92 and a piston housing 94, and a piston assembly 96 retained in an annular piston chamber 98 formed in piston housing 94. Clutch drum 78 is fixed (i.e., welded) to piston housing 94. As seen, a bearing assembly 102 supports end plate 92 for rotation relative to input shaft 42.

Piston assembly 96 is supported for axial sliding movement in piston chamber 98 for applying a compressive clutch engagement force on clutch pack 76, thereby transferring drive torque and limiting relative rotation between input shaft 42 and pinion shaft 54. The amount of torque transferred is progressive and is proportional to the magnitude of the clutch engagement force exerted by piston assembly 96 on clutch pack 76 which, in turn, is a function of the fluid pressure within piston chamber 98. Moreover, the fluid pressure generated by pump 90 and delivered to piston chamber 98 is largely a function of the speed differential between propshaft 28 and pinion shaft 54.

Figure 5:
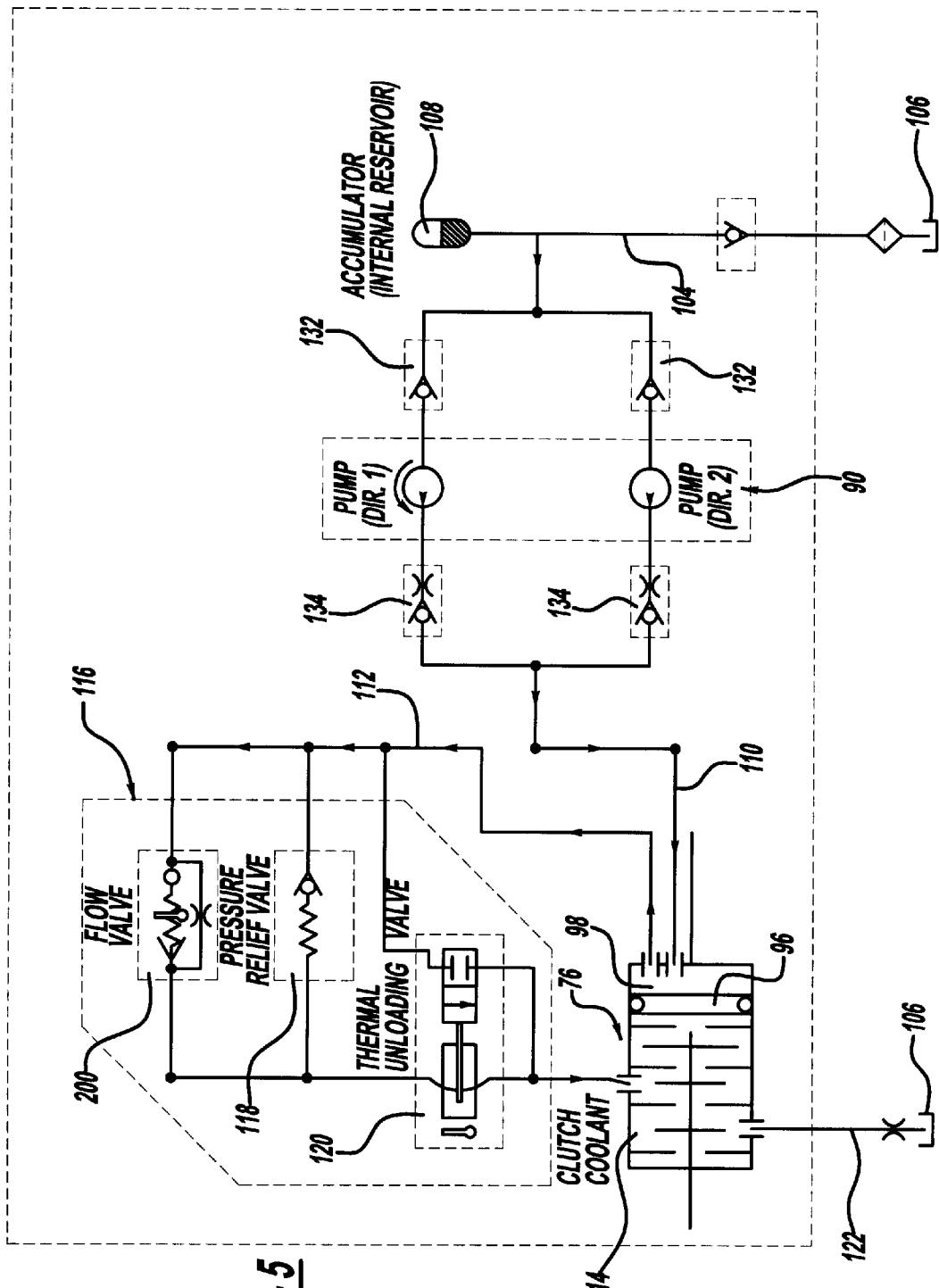
FIG. 5 is a schematic diagram illustrating a hydraulic control circuit associated with the on-demand hydraulic coupling shown in FIG. 3.

With particular reference to FIG. 5, a fluid distribution and valving arrangement is shown for controlling the delivery of fluid to piston chamber 98. The fluid distribution system includes a first flow path 104 for supplying hydraulic fluid from a sump 106 to an inlet reservoir 108 located at the inlet or suction side of fluid pump 90, and a second flow path 110 for supplying fluid from the discharge or outlet side of pump 90 to piston chamber 98. A third flow path 112 extends through piston assembly 96 for venting fluid from piston chamber 98 into a clutch chamber 114 in close proximity to clutch pack 76. A multi-function control valve 116 forms part of piston assembly 96 and provides at least two functional modes of operation. The first mode, hereinafter referred to as its pressure relief function, is schematically illustrated by a pressure relief valve 118. The second mode of operation, hereinafter referred to as its thermal unload function, is schematically indicated by a thermal unload valve 120. With each function, fluid discharged from piston chamber 98 is delivered to clutch chamber 114 for cooling clutch pack 76 and is then returned to sump 106 via a fourth flow path 122. According to the structure shown, lubrication slots 124 formed in hub 74 and exhaust ports 126 formed in drum 78 define fourth flow path 122.

First flow path 104 is defined by a pair of inlet ports 130 formed through first end plate 92. A one-way check valve 132 is provided for selectively opening and closing each of inlet ports 130. Specifically, one-way check valves move between "open" and "closed" positions in response to the direction of pumping action generated by fluid pump 90. Rotation of the pump components in a first direction acts to open one of check valves 132 and to close the other for permitting fluid to be drawn from sump 106 into inlet reservoir 108. The opposite occurs in the case of pumping in the reverse rotary direction, thereby assuring bi-directional operation of pump 90. Check valves 132 are preferably reed-type valves mounted on rivets secured to end plate 92. Check valves 132 are of the normally-closed type to maintain fluid within inlet reservoir 108.

A valving arrangement associated with second flow path 110 includes a second pair of one-way check valves 134 that are located in a pair of flow passages 136 formed in piston housing 94 between the outlet of pump 88 and piston chamber 98. As before, the direction of pumping action establishes which of check valves 134 is in its "open" position and which is in its "closed" position to deliver pump pressure to piston chamber 98. Upon cessation of pumping action, both check valves 134 return to their closed position to maintain fluid pressure in piston chamber 98. Thus, check valves 134 are also of the normally-closed variety.

As noted, fluid pump 90 is operable for pumping hydraulic fluid into piston chamber 98 to actuate transfer clutch 70. Fluid pump 90 is bi-directional and is capable of pumping fluid at a rate proportional to speed differential between its pump components. In this regard, pump 90 is shown as a gerotor pump assembly having a pump ring 152 that is fixed (i.e., keyed or splined) to pinion shaft 54, and an eccentric stator ring 154 that is retained in an eccentric chamber formed in end plate 92. Pump ring 152 has a plurality of external lobes that rotate concentrically relative to pinion shaft 54 about a common rotational axis. Stator ring 154 includes a plurality of internal lobes and has an outer circumferential edge surface that is journally supported within a circular internal bore formed in end plate 92. The internal bore is offset from the rotational axis such that, due to meshing of internal lobes of stator ring 154 with external lobes of pump ring 152, relative rotation between pump ring 152 and eccentric stator ring 154 causes eccentric rotation of stator ring 154. It will be understood that fluid pump 98 can be any type of mechanical pump capable of generating pumping action due to a speed differential.

Piston assembly 96 is shown to include a piston 158 and control valve 116. Piston 158 includes a radial web segment 160 sealed by seal ring 162 for movement relative to piston housing 94. Piston 158 further includes one or more circumferential rim segments 166 extending from web segment 160 and which engages clutch pack 76. Piston 158 further defines a cup segment 168 within which control valve 116 is retained. Seal rings 170 are provided to seal control valve 116 relative to cup segment 168 and a circlip 172 is provided to retain control valve 116 in cup segment 168. Control valve 116 includes a tubular housing 174 defining a series of inlet ports 176 and a valve chamber 178 having a series of outlet ports 180. Inlet ports 176 and valve chamber 178 are delineated by a rim section 182 having a central valve aperture formed therethrough. A thermal actuator 186 is retained in pressure chamber 188 of housing 174 and includes a post segment 190. A head segment of a valve member 192 is seated against the valve aperture and engages the terminal end of post segment 190. A spring 196 mounted between an end cap 198 and valve member 192 is operable to bias valve member 192 against the seat surface defined by the valve aperture for normally preventing fluid flow from inlet ports 176 to outlet ports 180. Control valve 116 is arranged such that inlet ports 176 communicate with piston chamber 98 with valve member 192 directly exposed to the fluid pressure in piston chamber 98.

Hydraulic coupling 72 includes a flow regulator 200 which is operable for setting the predetermined minimum pressure level within piston chamber 98 at which transfer clutch 70 is initially actuated and which is further operable to compensate for temperature gradients caused during heating of the hydraulic fluid. Preferably, flow regulator 200 is a reed-type valve member secured to piston assembly 96 such that its terminal end is normally maintained in an "open" position displaced from a by-pass port 202 formed through piston 158 for permitting by-pass flow from piston chamber 94 to clutch chamber 114. During low-speed relative rotation, the pumping action of fluid pump 90 causes fluid to be discharged from piston chamber 94 through the by-pass port into clutch chamber 114. Flow regulator 200 is preferably a bimetallic valve element made of a laminated pair of dissimilar metallic strips having different thermal coefficients of expansion. As such, the terminal end of the valve element moves relative to its corresponding by-pass port regardless of changes in the viscosity of the hydraulic fluid caused by temperature changes. This thermal compensation feature can be provided by one or more bimetallic valves. However, once the fluid in piston chamber 98 reaching its predetermined pressure level, the terminal end of the bimetallic valve element will move to a "closed" position for inhibiting fluid flow through the by-pass port. This flow restriction causes a substantial increase in the fluid pressure within piston chamber 98 which, in turn, causes piston 158 to move and exert a large engagement force on clutch pack 86. A bleed slot (not shown) is formed in one of the by-pass port or bimetallic valve element and permits a small amount of bleed flow even when the flow regulator is in its closed position for gradually disengaging transfer clutch 70 when fluid pump 90 is inactive.

The pressure relief function of control valve 116 occurs when the fluid pressure in piston chamber 98 is greater than that required to close bimetallic flow regulator 200 but less than a predetermined maximum value. In this pressure range, the bias of spring 196 is adequate to maintain valve member 192 seated against the aperture such that fluid is prevented from flowing from piston chamber 94 through outlet ports 180. However, when the fluid pressure in piston chamber 98 exceeds this maximum value, valve member 192 is forced to move in opposition to the biasing of spring 196. As such, fluid in piston chamber 98 is permitted to flow through the aperture into valve chamber 178 from where it is discharged from outlet ports 180. The fluid discharged from outlet ports 180 circulates in clutch chamber 114 to cool clutch pack 76 and is directed to flow across actuator section 210 of thermal actuator 186 prior to discharge to pump through exhaust ports 126 in drum 78. Use of this pressure relief function torque limits hydraulic coupling 44 and prevents damage thereto.

The thermal unload function is actuated when the fluid temperature detected by actuator section 210 of thermal actuator 186 exceeds a predetermined maximum value. In such an instance, post segment 190 moves from its retracted position shown to an extended position for causing valve member 192 to move away from seated engagement against aperture (or maintain valve member 192 in its displaced position during pressure relief) and permit fluid in pressure chamber 98 to vent into clutch chamber 114, thereby disengaging transfer clutch 70. Once piston chamber 98 has been unloaded, the fluid and thermal actuator 186 will eventually cool to a temperature below the predetermined value, whereby post segment 190 will return to its retracted position for resetting the thermal unload function. Thermal actuator 186 is of a type manufactured by Therm-Omega Tech of Warminster, Pa. or Standard-Thomson of Waltham, Mass.

Figure 6:
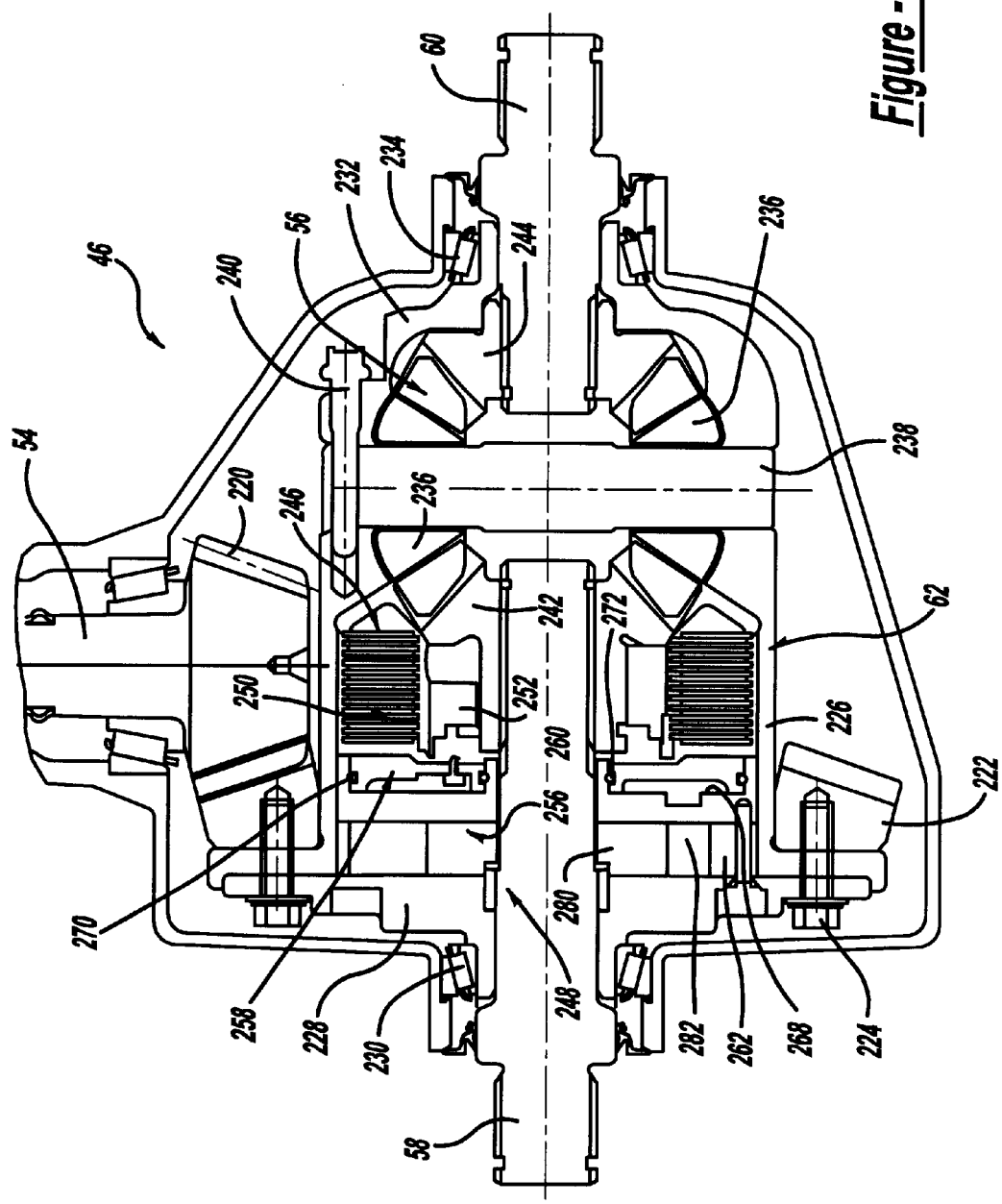
FIG. 6 is a sectional view of a differential drive module associated with the secondary drive axle of the present invention.
Figure 7:
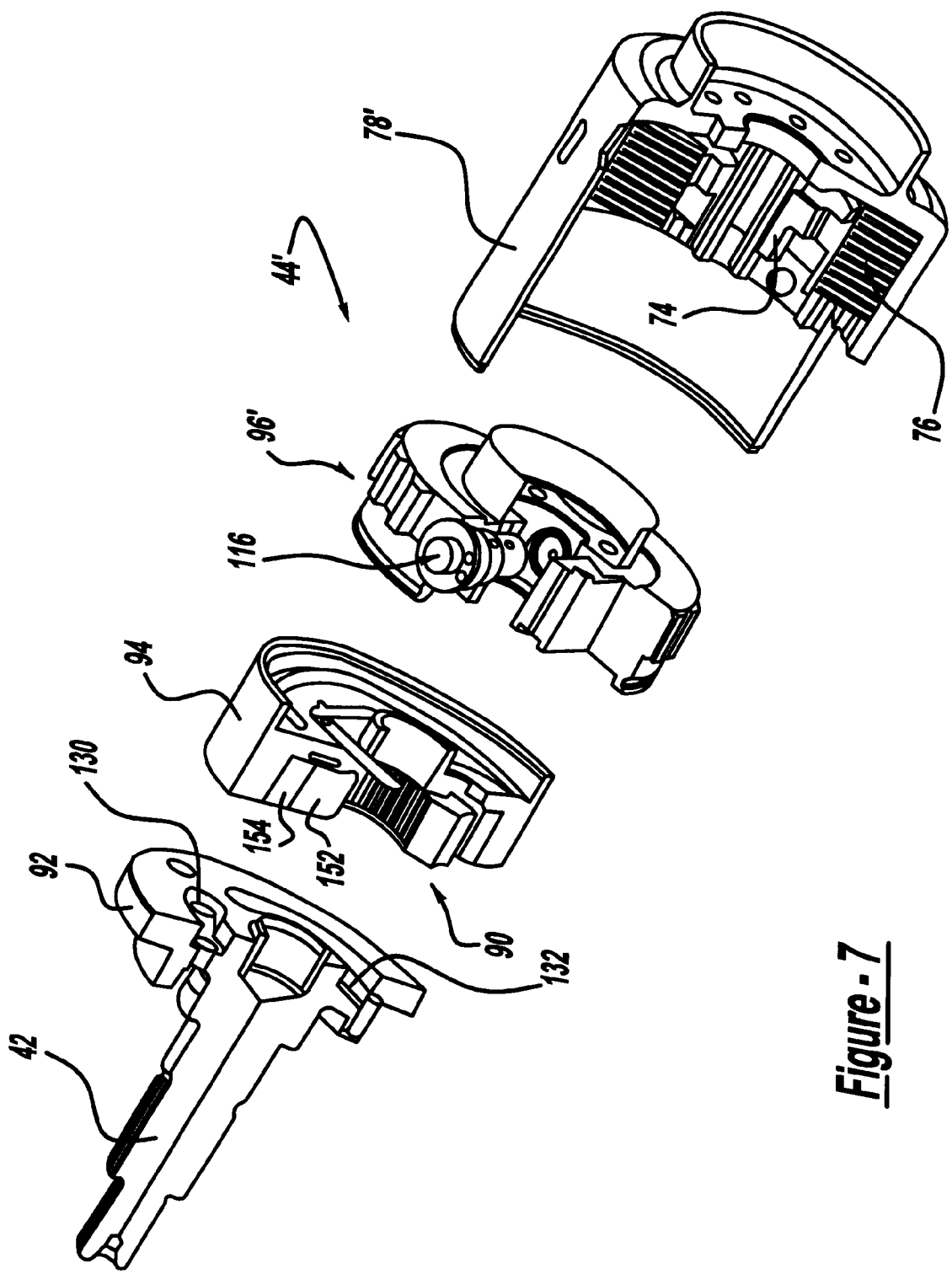
FIGS. 7 through 10 are various exploded and sectional perspective views of a slightly modified version of the on-demand hydraulic coupling.
Figure 8:
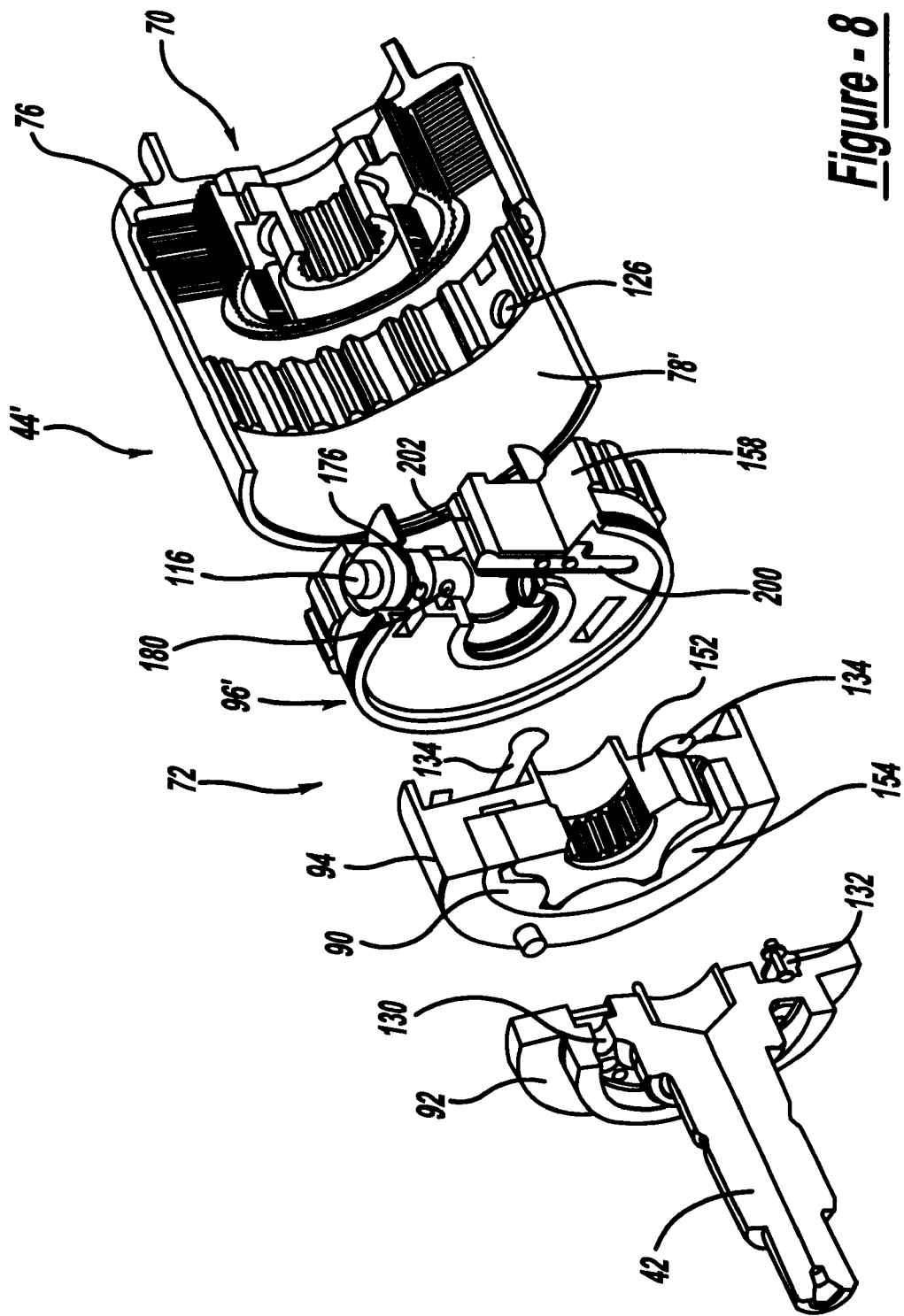
Figure 9:
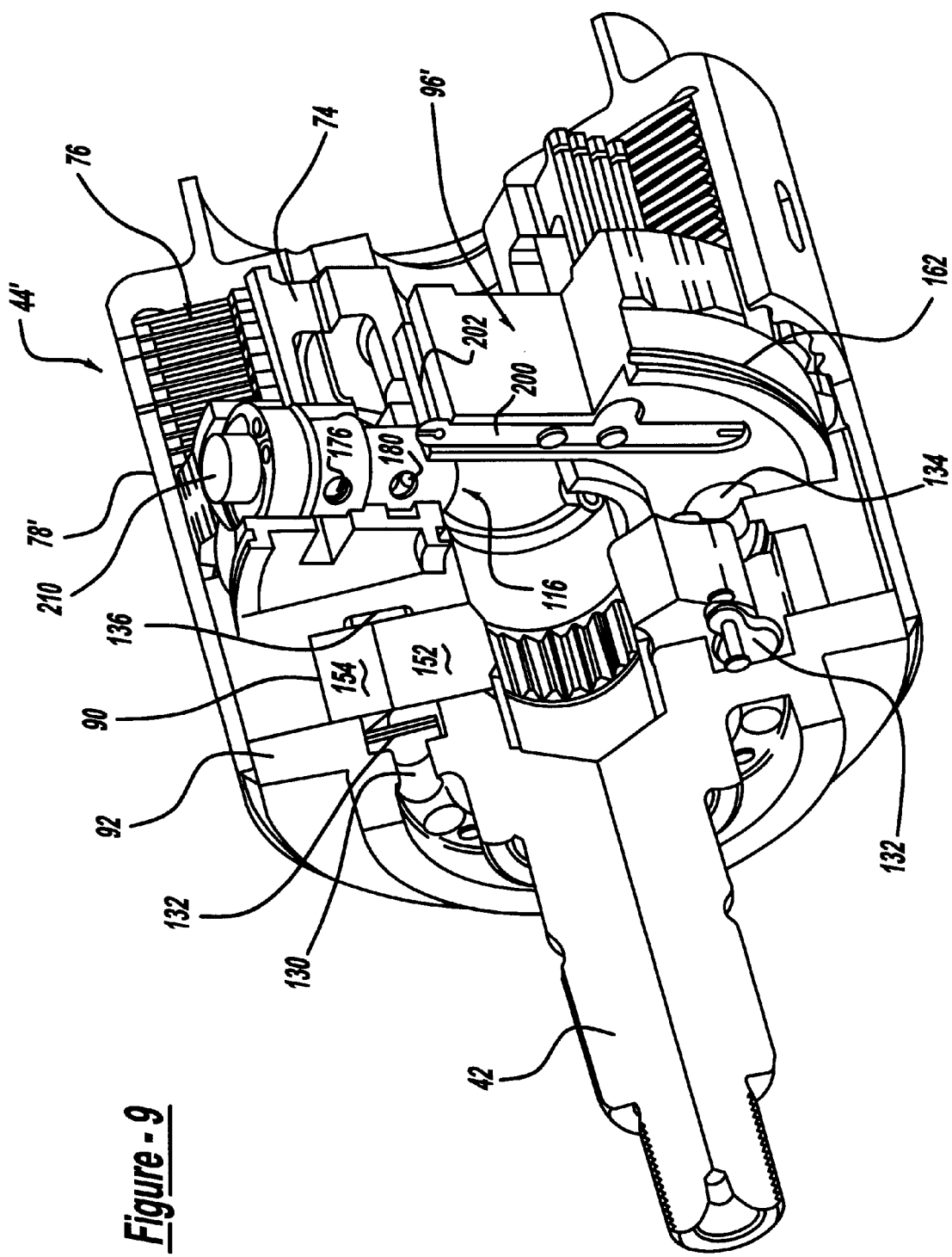
Figure 10:
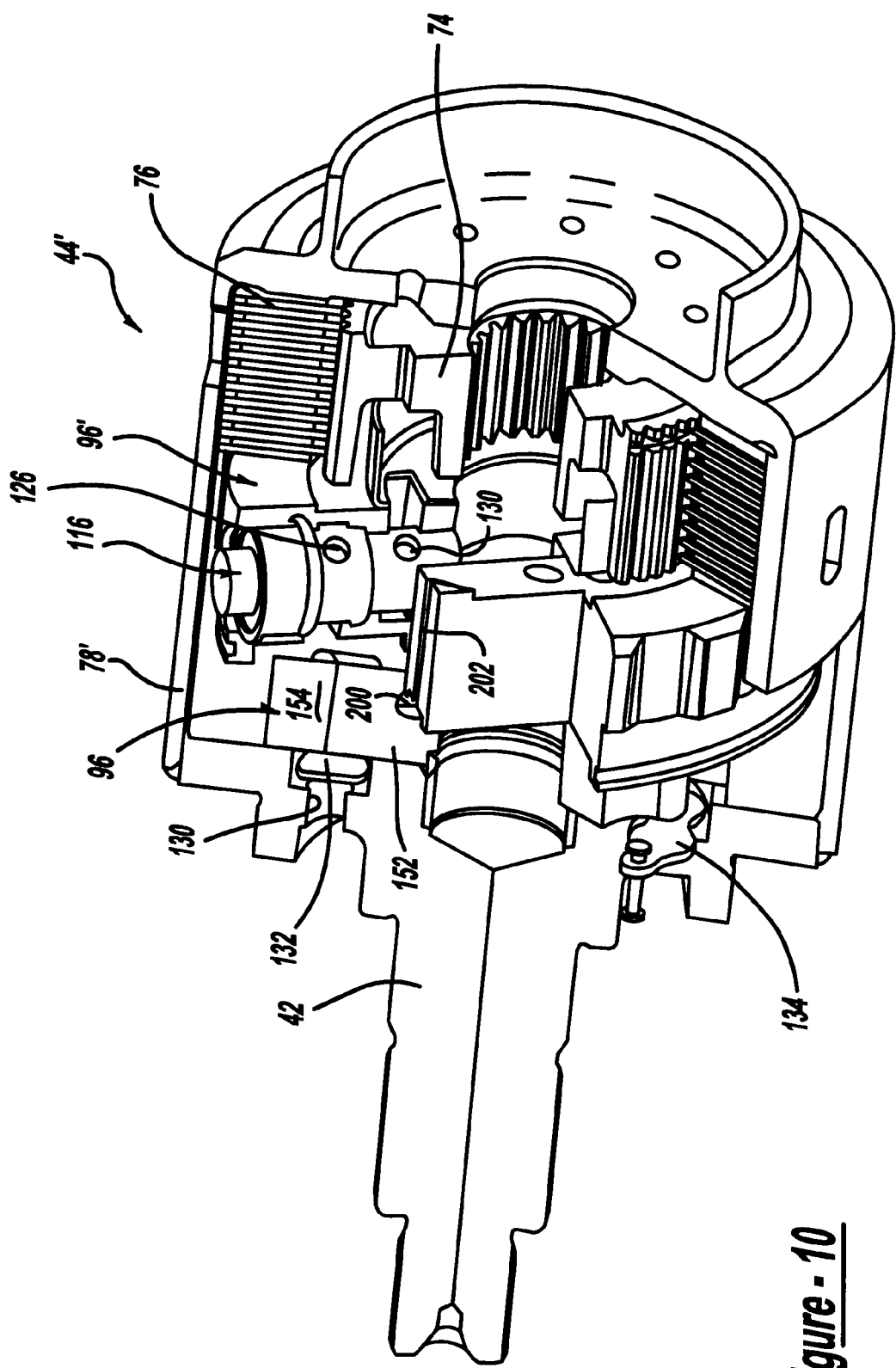

Referring primarily now to FIG. 6, the components of drive module 46 will be described. A drive pinion 220 is formed at the end of pinion shaft 54 and is meshed with a bevel ring gear 222 fixed via bolts 224 to a drive casing 226. An end cap 228 is also fixed via bolts 224 to drive casing 226 and is supported for rotation relative to housing 40 via a bearing assembly 230. A second end cap 232 is formed at the opposite end of drive casing 226 and is rotatably supported on housing 40 via a bearing assembly 234. Bevel gearset 56 includes a pair of pinion gears 236 rotatably supported on opposite ends of pinion shaft 238 that is non-rotatably fixed to drive casing 226 via a retainer screw 240. Gearset 56 further includes a first side gear 242 splined for rotation with first output shaft 58 and a second side gear 244 splined for rotation with second output shaft 60.

Second hydraulic clutch 62 includes a biasing clutch 246 and a clutch actuator 248. Biasing clutch 246 is a multi-plate clutch assembly having a clutch pack 250 of alternately interleaved inner and outer clutch plates that are respectively splined to a clutch hub 252 and drive casing 226. Hub 252 is splined to an axial hub section 254 of first side gear 242. Clutch actuator 248 includes a fluid pump 256 and a piston assembly 258. Pump 256 is a gerotor pump assembly disposed in a pump chamber formed between end cap 228 and a piston housing 260. An eccentric outer ring 262 of gerotor pump 256 and piston housing 260 are fixed for rotation with drive casing 226 via bolts 264. Piston assembly 258 is disposed in a piston chamber 266 formed in piston housing 260. In a preferred construction, piston assembly 258 is similar in structure and function to that of piston assembly 96 such that a control valve (not shown) similar to control valve 116 is used. As seen, seal rings 270 and 272 seal a piston 274 of piston assembly 258 relative to piston housing 260. Assuming that piston assembly 258 is similar to piston assembly 96, the hydraulic circuit shown in FIG. 5 would be applicable to illustrate the operation of second hydraulic coupling 62.

Pump 256 includes a pump ring 280 splined to first output shaft 68, and a stator ring 282 disposed between pump ring 280 and eccentric ring 262. The external lobes of pump ring 280 mesh with the internal lobes of stator ring 282, with stator ring 282 journalled in an eccentric aperture formed in eccentric rig 262. Relative rotation between drive casing 226 and first output shaft 58 generates a fluid pumping action. Check valves 132 are retained in inlet ports formed in end cap 228 while one-way check valves 134 are retained in flow passages formed in piston housing 260 between the outlet of pump 256 and piston chamber 266. A pressure regulator valve is mounted in a by-pass passage through piston 274 to control pressurization of piston chamber 266 so as to allow a limited amount of unrestrained inter-wheel speed differentiation, such as during turns.

This arrangement of an in-line hydraulic coupling between prop shaft 78 and pinion shaft 54 permits "on-demand" transfer of drive torque to secondary driveline 16. Thus, all-wheel drive traction control is provided when needed in response to a loss of traction between the front and rear drivelines. Combining the in-line coupling with second hydraulic coupling 62 in drive module 46 provides "front-to-back" and "side-to-side" traction control that is well suited for use in conjunction with a secondary driveline system.

Referring now to FIGS. 7 through 10, a modified version of first hydraulic coupling, identified by reference numeral 44', is shown. Hydraulic coupling 44' is generally similar in structure and function to hydraulic coupling 44, with the exception that piston assembly 96' is now splined to drum 78'. However, the pump valving, operation of the bimetallic flow control valve and control valve 116 are substantially similar.

Figure 11:
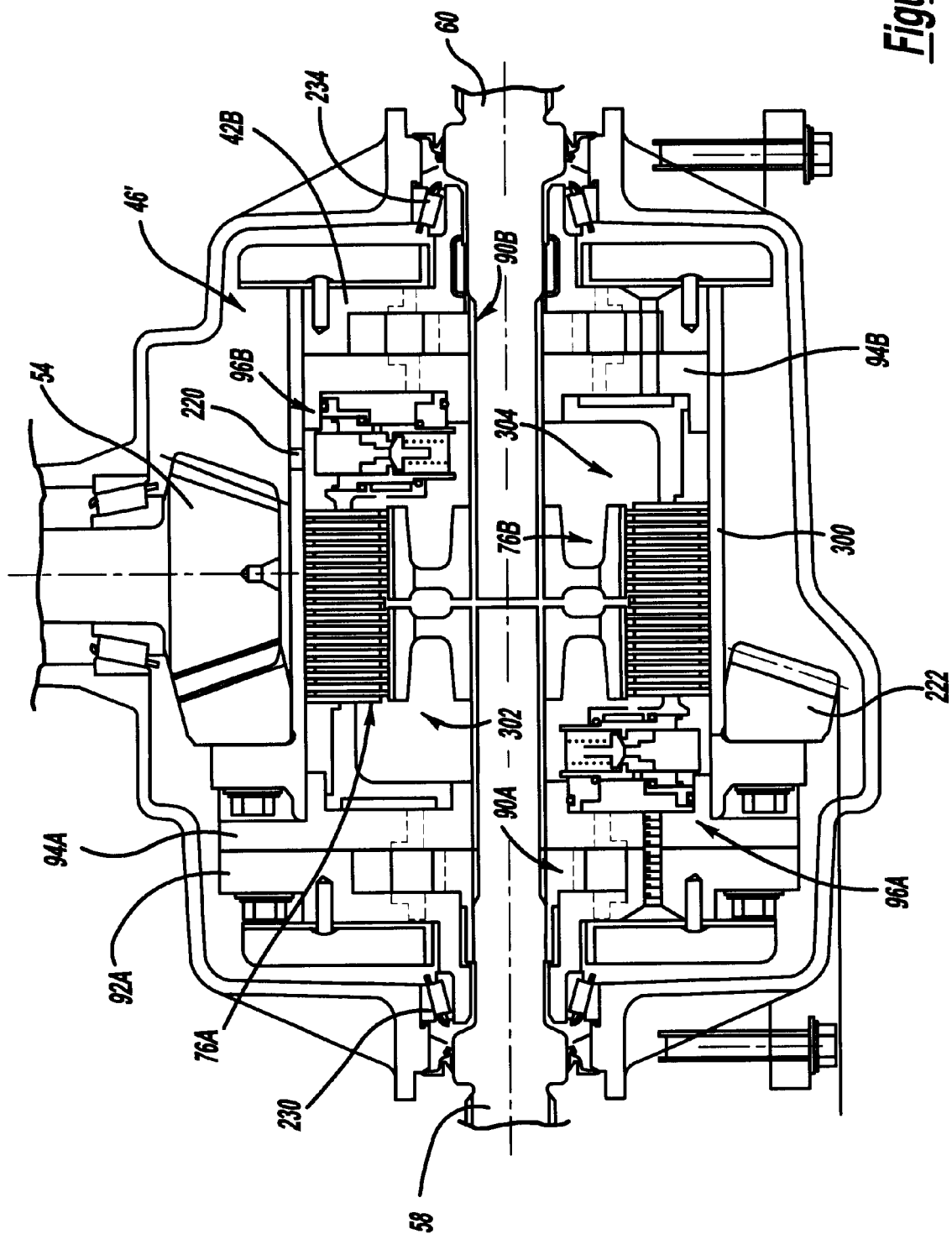
FIG. 11 is a modified drive module adapted for use with the secondary drive axle assembly.

Referring now to FIG. 11, a dual-clutch drive module 46' is shown which can be used in substitution for drive module 46. Drive module 46' includes a drive case 300 to which ring gear 222 is bolted, a first hydraulic clutch 302 connected between drive case 300 and first output shaft 58, and a second hydraulic clutch 304 connected between drive case 300 and second output shaft 60. Clutches 302 and 304 are generally similar to hydraulic coupling 44 and include clutch packs 76A and 76B, hydraulic pumps 90A and 90B, and piston assemblies 96A and 96B. Pumps are located between piston housings 94A and 94B and end caps 92A and 92B. Clutch 302 provides speed and torque control between drive case 300 and output shaft 58 while clutch 304 provides similar control between drive case 300 and output shaft 60. Thus, left-to-right (i.e., side-to-side) torque control and speed differentiation is provided.

What is claimed is:

1. A drive axle assembly for use in a motor vehicle to transfer drive torque from a powertrain to a pair of wheels, comprising:

a first hydromechanical coupling having an input shaft driven by the powertrain, a pinion shaft, a first transfer clutch operably disposed between said input shaft and said pinion shaft, a first piston disposed in a first piston chamber and actuatable to engage said first transfer clutch for transferring drive torque to said pinion shaft, a first fluid pump for pumping hydraulic fluid from a sump to said first piston chamber in response to relative rotation between said input shaft and said pinion shaft, and a control valve mounted to said first piston, said control valve operable to vent fluid from said first piston chamber to said sump in response to the occurrence of either of an over-pressure and an over-temperature condition;

first and second output shafts adapted for connection to the pair of wheels;

a differential assembly including a casing driven by said pinion shaft, and a gearset interconnecting said casing to said first and second output shafts; and a second hydromechanical coupling having a second transfer clutch operably disposed between said casing and said gearset of said differential assembly, a second piston disposed in a second piston chamber which is actuatable in response to fluid pressure in said second piston chamber to engage said second transfer clutch for biasing torque and limiting slip between said first and second output shafts, and a second pump for pumping fluid from said sump to said second piston chamber in response to relative rotation between said casing and one of said first and second output shafts.

2. The drive axle of claim 1 wherein said first hydromechanical coupling includes a first flow path for supplying hydraulic fluid from said sump to an inlet of said first pump, a second flow path for supplying hydraulic fluid from an outlet of said first pump to said first piston chamber, and a third flow path through said first piston for venting fluid from said first piston chamber to said sump, and wherein said control valve is located in said third flow path.

3. The drive axle of claim 1 wherein said control valve includes a valve housing defining a valve chamber in fluid communication with said sump and a flow port providing fluid communication between said first piston chamber and said valve chamber, and a thermal unload valve having a thermal actuator mounted in said valve chamber and a valve member movable from a first position to a second position when the temperature of the fluid in said valve chamber exceeds a predetermined temperature value, said valve member is operable in its first position to prevent fluid flow through said flow port and is further operable in its second position to permit fluid flow through said flow port for venting said first piston chamber.

4. The drive axle of claim 1 wherein said control valve includes a pressure relief valve for venting fluid from said first piston chamber to said sump when the fluid pressure in said first piston chamber exceeds a predetermined pressure value.

5. The drive axle of claim 1 wherein said control valve further includes a flow regulator for regulating flow of hydraulic fluid from said first piston chamber to said sump to control the fluid pressure in said first piston chamber for actuating said first piston.

6. The drive axle of claim 1 wherein said first piston includes a radial web segment sealed relative to said first piston chamber, a rim segment engageable with said first transfer clutch, and a cup segment formed between said web segment and said rim segment, said control valve being mounted in said cup segment.

7. The drive axle of claim 6 wherein said control valve comprises:

a tubular housing retained in said cup segment of said first piston and defining an inlet port communicating with said first piston chamber, a first chamber communicating with said inlet port, a second chamber communicating with said sump, and an aperture formed between said first and second chambers; and a valve member moveable from a first position closing said aperture when the fluid pressure in said first chamber is less than a predetermined pressure value to a second position for opening said aperture when the fluid pressure in said first chamber exceeds said predetermined pressure value.

8. The drive axle of claim 7 wherein said control valve further includes a thermal actuator operable to move said valve member from its first position to its second position when the fluid temperature in said first chamber exceeds a predetermined temperature value.

9. The drive axle of claim 1 wherein said gearset of said differential assembly includes a pair of pinion gears supported for rotation with said casing, a first side gear coupled to said first output shaft that is meshed with said pinion gears, and a second side gear coupled to said second output shaft that is meshed with said pinion gears.

10. The drive axle of claim 9 wherein said second transfer clutch of said second hydromechanical coupling is operably disposed between said casing and said second side gear.

11. The drive axle of claim 1 wherein said second hydromechanical coupling further includes a second control valve that is operable to vent fluid from said second piston chamber to said sump in response to an occurrence of at least one of an over-pressure condition and an over-temperature condition in said second piston chamber.

12. The drive axle of claim 11 wherein said second hydromechanical coupling includes a first flow path for supplying hydraulic fluid from said sump to an inlet of said second pump, a second flow path for supplying hydraulic fluid from an outlet of said second pump to said second piston chamber, and a third flow path through said second piston for venting fluid from said second piston chamber to said sump, and wherein said second control valve is located in said third flow path.

13. The drive axle of claim 11 wherein said second control valve includes a valve housing defining a valve chamber in fluid communication with said sump and a flow port providing fluid communication between said second piston chamber and said valve chamber, and a thermal unload valve having a thermal actuator mounted in said valve chamber and a valve member movable from a first position to a second position when the temperature of the fluid in said valve chamber exceeds a predetermined temperature value, said valve member is operable in its first position to prevent fluid flow through said flow port and is further operable in its second position to permit fluid flow through said flow port for venting said second piston chamber.

14. The drive axle of claim 11 wherein said second control valve includes a pressure relief valve for venting fluid from said second piston chamber to said sump when the fluid pressure in said second piston chamber exceeds a predetermined pressure value.

15. The drive axle of claim 11 wherein said second control valve further includes a flow regulator for regulating flow of hydraulic fluid from said second piston chamber to said sump to control the fluid pressure in said second piston chamber for actuating said first piston.

16. The drive axle of claim 11 wherein said second piston includes a radial web segment sealed relative to said second piston chamber, a rim segment engageable with said second transfer clutch, and a cup segment formed between said web segment and said rim segment, said second control valve is mounted in said cup segment.

17. A drive axle assembly for use in a motor vehicle to transfer drive torque from a powertrain to a pair of wheels, comprising:

a first hydromechanical coupling having an input shaft driven by the powertrain, a pinion shaft, a first transfer clutch operably disposed between said input shaft and said pinion shaft, a first piston disposed in a first piston chamber and actuatable to engage said first transfer clutch for transferring drive torque to said pinion shaft, a first fluid pump for pumping hydraulic fluid from a sump to said first piston chamber in response to relative rotation between said input shaft and said pinion shaft, and a control valve mounted to said first piston, said control valve operable to vent fluid from said first piston chamber to said sump in response to the occurrence of either of an over-pressure and an over-temperature condition;

first and second output shafts adapted for connection to the pair of wheels;

a casing driven by said pinion shaft;

a second hydromechanical coupling having a second transfer clutch operably disposed between said casing and first output shaft, a second piston disposed in a second piston chamber which is actuatable in response to fluid pressure in said second piston chamber to engage said second transfer clutch, and a second pump for pumping fluid from said sump to said second piston chamber in response to relative rotation between said casing and said first output shafts; and a third hydromechanical coupling having a third transfer clutch operably disposed between said casing and said second output shaft, a third piston disposed in a third piston chamber which is actuatable in response to fluid pressure in said third piston chamber to engage said third transfer clutch, and a third pump for pumping fluid from said sump to said third piston chamber in response to relative rotation between said casing and said second output shaft.

18. The drive axle of claim 17 wherein said first hydromechanical coupling includes a first flow path for supplying hydraulic fluid from said sump to an inlet of said first pump, a second flow path for supplying hydraulic fluid from an outlet of said first pump to said first piston chamber, and a third flow path through said first piston for venting fluid from said first piston chamber to said sump, and wherein said control valve is located in said third flow path.

19. The drive axle of claim 17 wherein said control valve includes a valve housing defining a valve chamber in fluid communication with said sump and a flow port providing fluid communication between said first piston chamber and said valve chamber, and a thermal unload valve having a thermal actuator mounted in said valve chamber and a valve member movable from a first position to a second position when the temperature of the fluid in said valve chamber exceeds a predetermined temperature value, said valve member is operable in its second position to permit fluid flow through said flow port for venting said first piston chamber.

20. The drive axle of claim 17 wherein said first piston includes a radial web segment sealed relative to said first piston chamber, a rim segment engageable with said first transfer clutch, and a cup segment formed between said web segment and said rim segment, said control valve being mounted in said cup segment.

21. The drive axle of claim 20 wherein said control valve comprises:

a tubular housing retained in said cup segment of said first piston and defining an inlet port communicating with said first piston chamber, a first chamber communicating with said inlet port, a second chamber communicating with said sump, and a flow aperture between said first and second chambers; and a valve member moveable from a first position closing said flow aperture when the fluid pressure in said first chamber is less than a predetermined pressure value to a second position for opening said flow aperture when the fluid pressure in said first chamber exceeds said predetermined pressure value.

22. The drive axle of claim 21 wherein said control valve further includes a thermal actuator operable to move said valve member from its first position to its second position when the fluid temperature in said first chamber exceeds a predetermined temperature value.

23. The drive axle of claim 17 wherein said second hydromechanical coupling further includes a second control valve that is operable to vent fluid from said second piston chamber to said sump in response to an occurrence of at least one of an over-pressure condition and an over-temperature condition in said second piston chamber.

24. The drive axle of claim 22 wherein said third hydromechanical coupling further includes a third control valve that is operable to vent fluid from said third piston chamber to said sump in response to an occurrence of at least one of an over-pressure condition and an over-temperature condition in said second piston chamber.

25. A drive axle for use in a motor vehicle to transfer drive torque from a powertrain to a pair of wheels, comprising:
- a housing;
- an input shaft rotatably supported within said housing and adapted to be driven by the powertrain;
- an interaxle portion supported by said housing and driven by said input shaft, comprising a first transfer clutch operably interconnecting said input shaft and a pinion shaft, a first clutch actuator comprising a first piston selectively operable to engage said first transfer clutch, a first pump for selectively pumping actuation fluid to said first piston for actuation thereof, and a first control valve operable for selectively disengaging said first transfer clutch in response to either of a first condition or a second condition; and
- a differential portion supported within said housing, comprising a drive case rotatably driven by said pinion shaft, first and second output shafts driven by said drive case adapted for connection to the wheels, a second transfer clutch operably disposed between said drive case and said first output shaft, a second clutch actuator operable to engage said second transfer clutch for limiting relative rotation between said drive case and said first output shaft, and a second pump for selectively pumping actuation fluid to said second clutch actuator for engaging said second clutch.

26. The drive axle of claim 25 wherein said first control valve comprises a pressure relief valve biased to a first position and wherein said first condition is an over-pressure condition and once achieved said pressure relief valve is biased to a second position for relieving said over-pressure condition.

27. The drive axle of claim 26 wherein said first control valve further comprises a thermal actuator sensing said second condition for selectively actuating said relief valve to said second position, wherein said second condition is an over-temperature condition and once sensed said thermal actuator actuates said relief valve to said second position for enabling cooling of said first transfer clutch.

28. The drive axle of claim 25 wherein said second pump is operably disposed between said drive case and said first output shaft, whereby a rotational speed differential therebetween initiates pumping action of said second pump for actuating said second clutch actuator for engaging said second clutch.

29. The drive axle of claim 25, wherein said differential portion further comprises:
- a third transfer clutch in operable communication with both said drive case and said second output shaft;
- a third clutch actuator selectively operable to engage said third transfer clutch for prohibiting relative rotation between said drive case and said second output shaft; and
- a third pump for selectively pumping actuation fluid to said third clutch actuator for engaging said third transfer clutch.

30. The drive axle of claim 29 wherein said differential portion further comprises second and third control valves, respectively associated with said second and third clutch actuators, each for selectively disengaging said second and third transfer clutches, respectively, in response to a first condition.

31. The drive axle of claim 30 wherein said second and third control valves each comprise a relief valve biased in a first position and wherein said first condition is an over-pressure condition and once achieved said relief valve is biased to a second position for relieving said over-pressure condition.

32. The drive axle of claim 30 wherein said second and third control valves selectively disengage said second and third transfer clutches, respectively, in response to a second condition.

33. The drive axle of claim 32 wherein said second and third control valves each further comprise a thermal actuator sensing said second condition for selectively actuating said relief valve to a second position, wherein said second condition is an over-temperature condition and once sensed said thermal actuator actuates said relief valve to said second position for enabling cooling.

34. The drive axle of claim 29 wherein said third pump is operably disposed between said drive case and said second output shaft, whereby a rotational speed differential therebetween initiates pumping action of said third pump for actuating said third clutch actuator for engaging said third transfer clutch.

* * * * *